(12) United States Patent
Woolmer et al.

(10) Patent No.: US 10,826,338 B2
(45) Date of Patent: Nov. 3, 2020

(54) AXIAL FLUX MACHINE

(71) Applicant: Yasa Limited, Yarnton (GB)

(72) Inventors: Timothy Woolmer, Wheatley (GB); Christopher Edward Miller, Didcot (GB)

(73) Assignee: Yasa Limited, Yarnton (GB)

( * ) Notice: Subject to any disclaimer, the term of this patent is extended or adjusted under 35 U.S.C. 154(b) by 508 days.

(21) Appl. No.: 15/543,804

(22) PCT Filed: Jan. 14, 2016

(86) PCT No.: PCT/GB2016/050085
§ 371 (c)(1),
(2) Date: Jul. 14, 2017

(87) PCT Pub. No.: WO2016/113567
PCT Pub. Date: Jul. 21, 2016

(65) Prior Publication Data
US 2018/0013323 A1 Jan. 11, 2018

(30) Foreign Application Priority Data
Jan. 16, 2015 (GB) .................................. 1500745.3

(51) Int. Cl.
*H02K 1/18* (2006.01)
*H02K 7/07* (2006.01)
(Continued)

(52) U.S. Cl.
CPC .............. *H02K 1/182* (2013.01); *H02K 7/085* (2013.01); *H02K 21/24* (2013.01); *H02K 16/02* (2013.01)

(58) Field of Classification Search
CPC ........ H02K 16/02; H02K 1/182; H02K 21/24; H02K 7/085
See application file for complete search history.

(56) References Cited

U.S. PATENT DOCUMENTS 3,189,770 A 6/1965 Henry-Baudot
4,731,554 A 3/1988 Hall et al.
(Continued)

FOREIGN PATENT DOCUMENTS

CN 1134057 10/1996
CN 103329410 9/2013
(Continued)

OTHER PUBLICATIONS

Chinese Office Action, dated Dec. 26, 2018, in connection with Chinese Application No. 201680005613.1.
(Continued)

*Primary Examiner* — Bernard Rojas
(74) *Attorney, Agent, or Firm* — Meunier Carlin & Curfman LLC

(57) ABSTRACT

An axial flux machine is described. The machine has a stator comprising a stator housing enclosing a plurality of stator bars disposed circumferentially at intervals around an axis of the machine, and a rotor comprising a set of permanent magnets and mounted for rotation about the axis of the machine. The rotor is spaced apart from the stator along the axis of the machine to define a gap between the stator and rotor and in which magnetic flux in the machine is generally in an axial direction. The machine also comprises a hub assembly comprising a rotating hub and a mount separated by a bearing to permit the hub to rotate relative to the mount, the rotating hub comprising a hub flange and the mount comprising a mount flange, each of the flanges being spaced axially apart from one another. The machine further comprises a bulkhead for mounting the hub assembly and stator, wherein the bulkhead is mounted to the mount flange of the hub assembly and the stator housing is mounted to the bulkhead. The rotor comprises first and second rotors disposed either side of the stator, the first rotor being mounted (Continued)

to the hub flange and the second rotor being mounted only to the first rotor, the first and second rotors together forming a U-shaped rotor extending across and either side of the stator and being rotatable relative to the stator about the axis of the machine.

29 Claims, 9 Drawing Sheets

(51) Int. Cl.
*H02K 21/24* (2006.01)
*H02K 7/08* (2006.01)
*H02K 16/02* (2006.01)

(56) References Cited

U.S. PATENT DOCUMENTS

| | | | |
|---|---|---|---|
| 5,677,585 A * | 10/1997 | Ida | F16C 33/04 |
| | | | 310/91 |
| 5,854,526 A | 12/1998 | Sakamoto | |
| 6,195,226 B1 | 2/2001 | Papst | |
| 6,762,525 B1 | 7/2004 | Maslov et al. | |
| 2006/0043821 A1 | 3/2006 | Kojima et al. | |
| 2007/0228860 A1 | 10/2007 | Rao | |
| 2009/0322165 A1 | 12/2009 | Rittenhouse | |
| 2013/0147291 A1 * | 6/2013 | Woolmer | H02K 1/14 |
| | | | 310/58 |
| 2018/0013323 A1 * | 1/2018 | Woolmer | H02K 21/24 |
| 2018/0026500 A1 * | 1/2018 | Woolmer | H02K 21/24 |
| | | | 310/43 |
| 2018/0145574 A1 * | 5/2018 | McCaw | H02K 21/24 |

FOREIGN PATENT DOCUMENTS

| | | |
|---|---|---|
| GB | 992800 | 5/1965 |
| GB | 2358523 A | 7/2001 |
| GB | 2468017 | 8/2010 |
| GB | 2482928 A | 2/2012 |
| GB | 2486932 | 7/2012 |
| JP | H03150054 | 6/1991 |
| JP | 3384180 B2 | 3/2003 |
| KR | 100663641 | 1/2007 |

OTHER PUBLICATIONS

International Search Report dated Apr. 20, 2016, from International Application No. PCT/GB2016/050085, 4 pages.
Written Opinion dated Apr. 20, 2016, from International Appication No. PCT/GB2016/050085, 8 pages.
Combined Search and Examination Report under Sections 17 and 18(3) dated Jul. 29, 2015, from United Kingdom Application No. GB1500745.3, 5 pages.

* cited by examiner

AXIAL FLUX MACHINE

FIELD OF THE INVENTION

The present invention relates to axial flux machines.

BACKGROUND OF THE INVENTION

In the present invention, we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine of the present invention with a pair of rotors R1, R2 to either side of a stator S—although a simple structure of the present invention could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but one drawback is loss of rigid structure in which a bearing can be mounted to support rotors. Thus preferably for a YASA topology of double rotor, single stator axial flux motor a bearing is mounted within the stator confines and magnetic forces from rotors on either side of the stator are axially balanced. Rotors being designed to resist bending towards the stator.

There is previously described in GB2468017 a modular arrangement in which a bearing is enclosed within the confines of a stator said bearing supporting dual rotors wherein the entire load between the output and the annular housing is transmitted through the bearing between the stator and rotor, whereby no other mounting of the rotor or its output with respect to the stator housing is provided, and wherein the rotor stages each comprise an annular dish as shown schematically in FIG. 1a.

For axial flux motors high magnetic forces exist between rotor and stator which cause rotor(s) to bend towards the stator. Compounding these magnetic forces are vibration and precession forces that occur in some applications of the machine.

Designers of high torque and power dense motors seek to minimise physical air gaps between rotor permanent magnets and stator armatures and thereby magnetic reluctance. Physical air gaps are typically of the order of 1 mm and to avoid rotor(s) touching the stator, stiff bearing and rotor disc(s) are required.

One method of increasing stiffness in an axial flux motor rotor is to add radial ribs to rotor discs. However radial ribs are costly to machine and add length to the axial dimension of a motor. Another approach is to use materials with high intrinsic stiffness. However permanent magnet rotors require a magnetic return path to link segmented poles circumferentially distributed on a rotor. Iron based rotors are typically used and the mass of these increase significantly with increasing thickness thereby compromising torque and power density for a machine.

Because of these difficulties in providing sufficient stiffness in rotors without compromising torque and power density, motor designers have tended to focus on radial flux machines.

GB2486932 describes a radial flux motor in which a U-shaped yoke FIG. 4, conveys magnetic field to either side of an H-shaped stator. In this configuration stiffness is provided by way of a U-shaped yoke holding permanent magnets. This structure lacks stiffness, the inner rotor ring having no stiffening feature and rotors consist of multiple parts compounding tolerance errors. No sealing feature is taught so that a surrounding enclosure is required to prevent particulates from entering into rotor-stator air gaps.

U.S. Pat. No. 4,731,554 FIG. 1 and FIG. 2 teaches a similar exterior rotor motor wherein short axial length is enabled in a radial topology using U-shaped rotor reaching to either side of a stator armature.

The majority of prior art references teach radial flux rotors in which U-shaped magnetic yokes are open cups inside of which are mounted stator armatures. These formats resist magnetic compression forces by virtue of the strength of magnetic yoke materials alone and are not optimised for power or torque density.

An exterior rotor axial flux motor US2009/0322165 describes rotor(s) encircled, FIG. 3, by U-shaped stator(s). Resistance to stator movement towards rotor is provided by multiple stiff mechanical yokes. Rotor stiffness is achieved by external housing mounted on separated bearings or more commercially practical, US2009/0322165 FIG. 1a, three phase stator-rotors ganged together with widely spaced bearings.

In all prior art instances rotors and stators need further protection from environments by way of separate enclosures to prevent ingress of particulates to rotor stages. Sufficient rotor stiffness to avoid flex under magnetic or mechanical load is achieved through additional mass in yokes, and assembly is more complicated than the present invention.

In addition, general background prior art can be found in: US2009322165A1; GB992800A; JPH03150054A; KR100663641131; U.S. Pat. Nos. 5,854,526A; 6,762,525B1 and US2007228860A1

We have therefore appreciated a need for an improved axial flux machine.

SUMMARY OF THE INVENTION

The present invention therefor provides an axial flux machine comprising: a stator comprising a stator housing enclosing a plurality of stator bars disposed circumferentially at intervals around an axis of the machine, each of the stator bars having a set of coils wound therearound for generating a magnetic field; a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction; a hub assembly comprising a rotating hub and a mount separated by a bearing to permit the hub to rotate relative to the mount, the rotating hub comprising a hub flange and the mount comprising a mount flange, each of the flanges being spaced axially apart from one another; and a bulkhead for mounting the hub assembly and stator, wherein the bulkhead is mounted to the mount flange of the hub assembly, and wherein the stator housing is mounted to the bulkhead; wherein the rotor comprises first and second rotors disposed either side of the stator, the first rotor being mounted to the hub flange and the second rotor being mounted only to the first rotor, the first and second rotors together forming a U-shaped rotor extending across and either side of the stator and being rotatable relative to the stator about the axis of the machine.

By using a U-shaped rotor design and by using a hub assembly, a machine may be provided that has sufficient stiffness that only one rotor needs to be mounted to the rotating hub. This provides a compact axial flux machine.

The second rotor may be mounted only to the first rotor along its outer axial rim, forming a U-shaped rotor extending across and either side of an outer radial periphery of the stator.

In this version, the second rotor may be an L-shaped annulus, and wherein an inner surface of the second rotor facing the stator housing interacts with an outer surface of the bulkhead facing away from the stator to create a seal between the bulkhead and the second rotor to enclose the stator housing.

Providing a seal between the second rotor and stator prevents particulate and liquid ingress into the motor.

The inner surface of the second rotor may comprise an annular groove around an inner perimeter of the second rotor, an opening of the annular groove facing towards the stator housing, and wherein the bulkhead comprises a circular ridge facing towards the second rotor, the circular ridge being configured to sit within the annular groove of the second rotor to form a labyrinth seal with the annular groove.

Such an arrangement, as well as providing a labyrinth seal between the stator and rotor, also provides additional stiffness to the structure of the rotor.

Alternatively to the above, the second rotor may be mounted only to the first rotor along an internal portion located radially inward from its outer axial rim. In this case, the first and second rotors together form a U-shaped rotor extending across and either side of an internal radial periphery of the stator. Advantageously, this provides a machine where the magnetics may be separate from the structural supporting elements and bearing. As such, the rotor back-iron may be in two pieces with the inner periphery structural element easily modified to, for example, change the diameter of the hub bearing assembly without altering the magnetics.

In this version of the machine, where the second rotor is an annulus comprising a mounting portion extending from the annulus, the second rotor being mounted to the first rotor via the mounting portion, and the mounting portion separating the first and second rotors axially in the machine.

This version of the machine may also comprise a cover to enclose the first rotor. This cover would protect the first rotor from the ingress of spray and dust and other materials into the motor. The cover may be attached to the stator. Also, the mounting between the stator housing and the hub assembly mount flange may enclose the second rotor, thus providing a machine that is protected from the external environment.

Preferably, the stator is equidistant from the first and second rotors.

The stator housing may comprise first and second radial walls, and inner and outer generally cylindrical walls. One or both of the radial walls and the generally cylindrical walls may comprise a polymer. One or both of the radial walls and the generally cylindrical walls may comprise a thermoplastic polymer, in particular a high temperature thermoplastic polymer, preferably PPA.

In embodiments, the machine is a yokeless and segmented armature axial flux machine.

Since the machine comprises a bulkhead, the bulkhead may provide additional stiffness to the machine. Furthermore, the machine may be mountable to a structure via the mount flange of the hub assembly or the bulkhead.

In order to couple power into or out of the machine, the machine may comprise an axle or shaft that extends from and is coupled to the rotating hub. The shaft or axle may be coupled to a wheel or propeller.

The machine may be a motor or generator.

The present invention also provides a method of assembling an axial flux machine, such as the machine described above, the method comprising: mounting the stator to the bulkhead; mounting the bulkhead to the hub assembly mount flange; mounting the first rotor to the hub assembly hub flange; and mounting the second rotor to the first rotor along its outer axial rim, wherein the first and second rotors together form a U-shaped rotor extending across and either side of the stator, the rotors being rotatable relative to the stator about the axis of the machine.

In the above method, the second rotor is mounted only to the first rotor along its outer axial rim, forming a U-shaped rotor extending across and either side of an outer radial periphery of the stator.

The second rotor may be an L-shaped annulus, and wherein an inner surface of the second rotor facing the stator housing interacts with an outer surface of the bulkhead facing away from the stator to create a seal between the bulkhead and the second rotor to enclose the stator housing. The inner surface of the second rotor may comprise an annular groove around an inner perimeter of the second rotor, an opening of the annular groove facing towards the stator housing, and wherein the bulkhead comprises a circular ridge facing towards the second rotor, the circular ridge being configured to sit within the annular groove of the second rotor to form a labyrinth seal with the annular groove.

Alternative to the above method, the second rotor may be mounted only to the first rotor along an internal portion located radially inward from its outer axial rim, the first and second rotors together forming a U-shaped rotor enclosure extending across and either side of an internal radial periphery of the stator.

In this alternative method, wherein the second rotor is an annulus comprising a mounting portion extending from the annulus, the second rotor being mounted to the first rotor via the mounting portion, and the mounting portion separating the first and second rotors axially in the machine.

This alternative method may also comprise mounting a cover to enclose the first rotor. The cover may be attached to the stator. Furthermore, the bulkhead between the stator housing and the hub assembly mount flange may enclose the second rotor.

When the stator and first and second rotors are mounted, the stator is preferably equidistant from the first and second rotors, to enable the forces between the stator and respective rotor to balance.

The method may also comprise mounting the machine to a structure via the mount flange or the bulkhead. Furthermore, the method may comprise mounting an axle or shaft to the rotating hub or first rotor, which enables power to be delivered to or extracted from the machine.

LIST OF FIGURES

The present invention will now be described, by way of example on, and with reference to the accompanying figures, in which.

DETAILED DESCRIPTION OF THE PREFERRED EMBODIMENTS

Figure 1A:
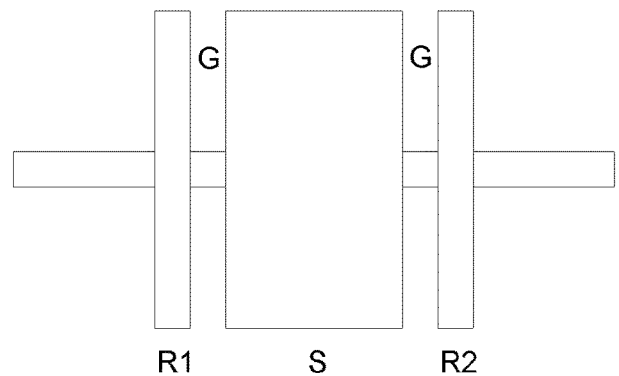
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
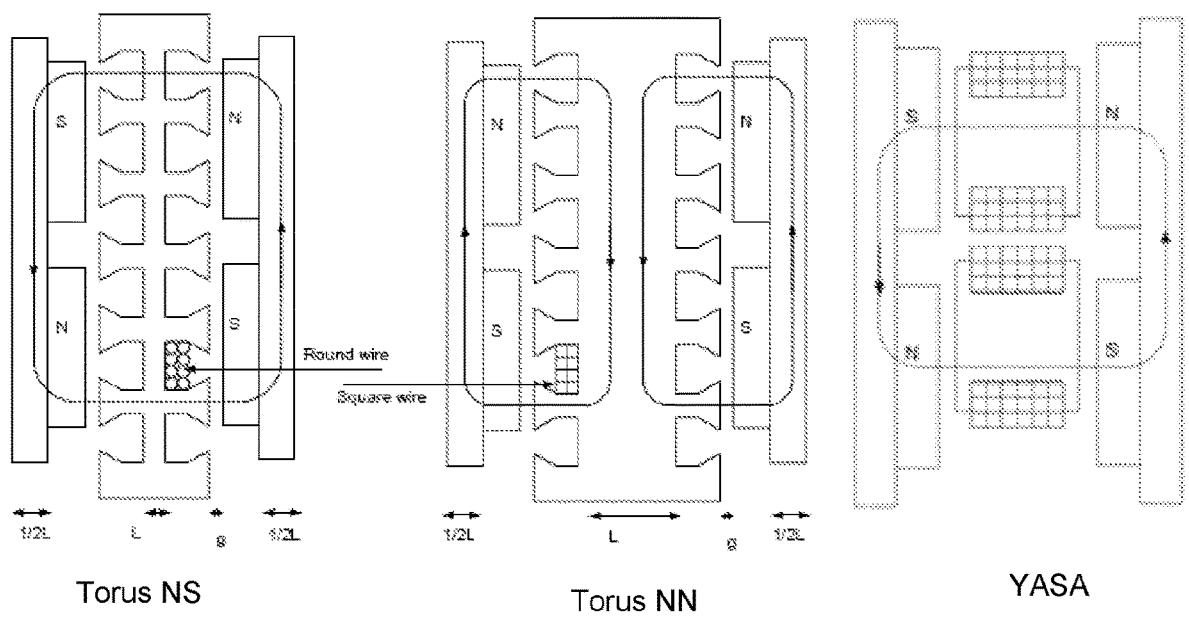
Figure 1C:
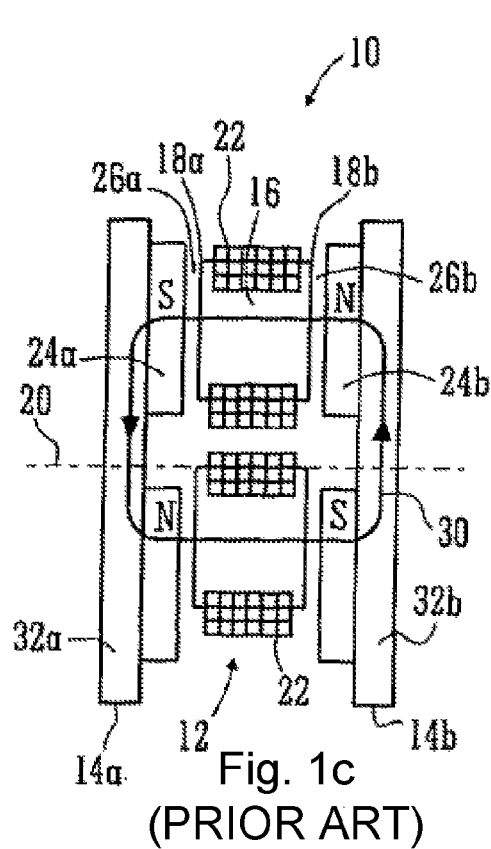
Figure 2:
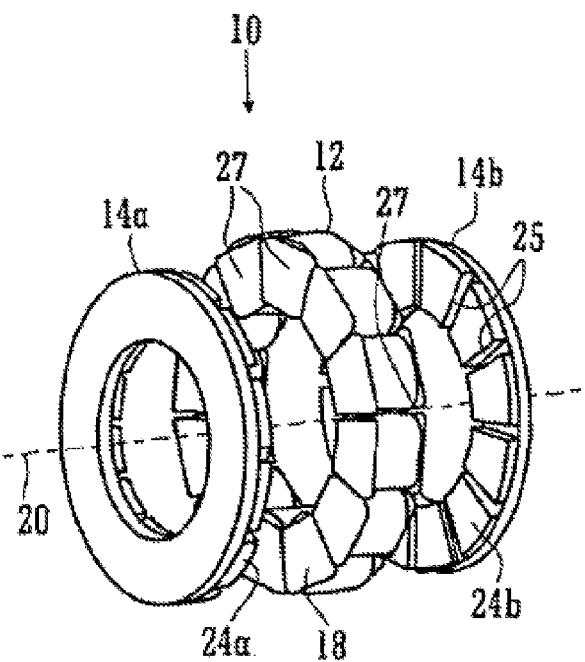
FIG. 2 shows a perspective view of the YASA machine of FIG. 1c.
Figure 3:
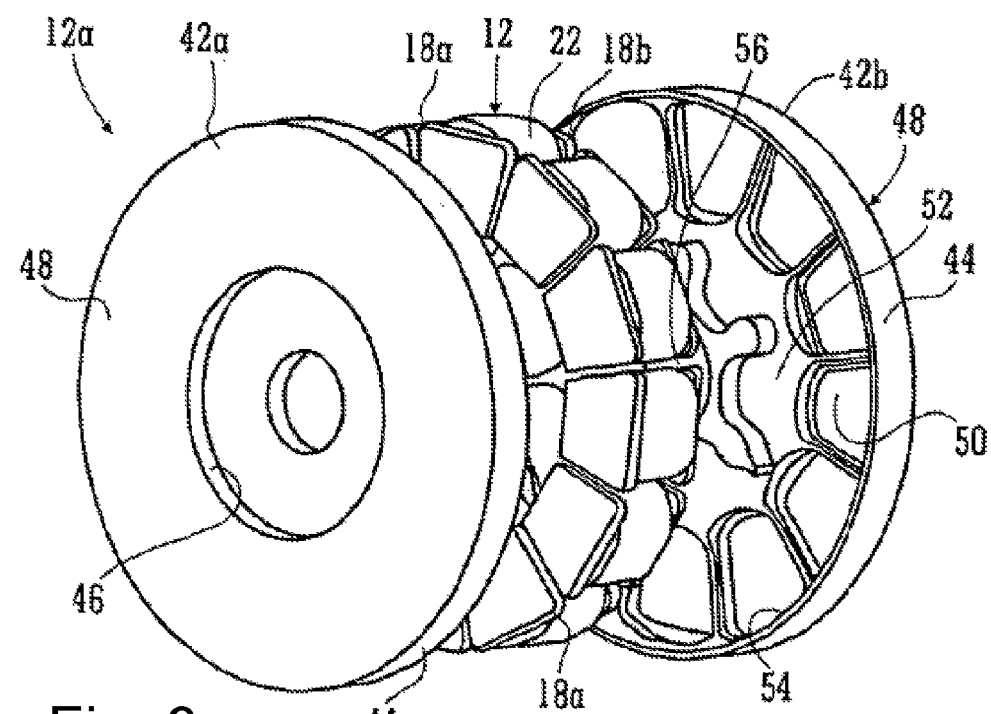
FIG. 3 shows a perspective exploded view of a stator and stator housing for a YASA machine.
Figure 4:
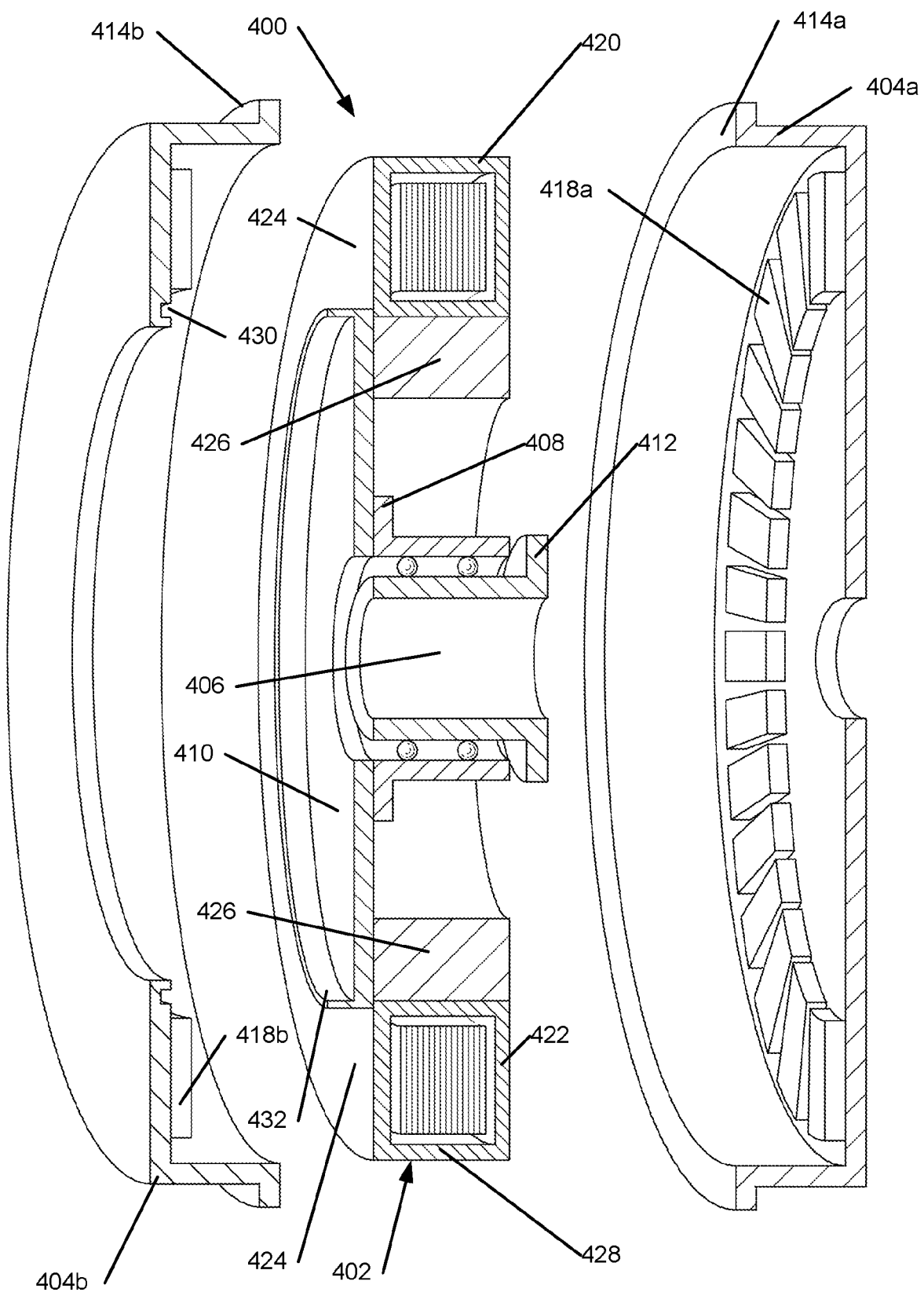
FIG. 4 shows an exploded view of a cupped rotor axial flux permanent magnet machine according to an embodiment of the invention.
Figure 5:
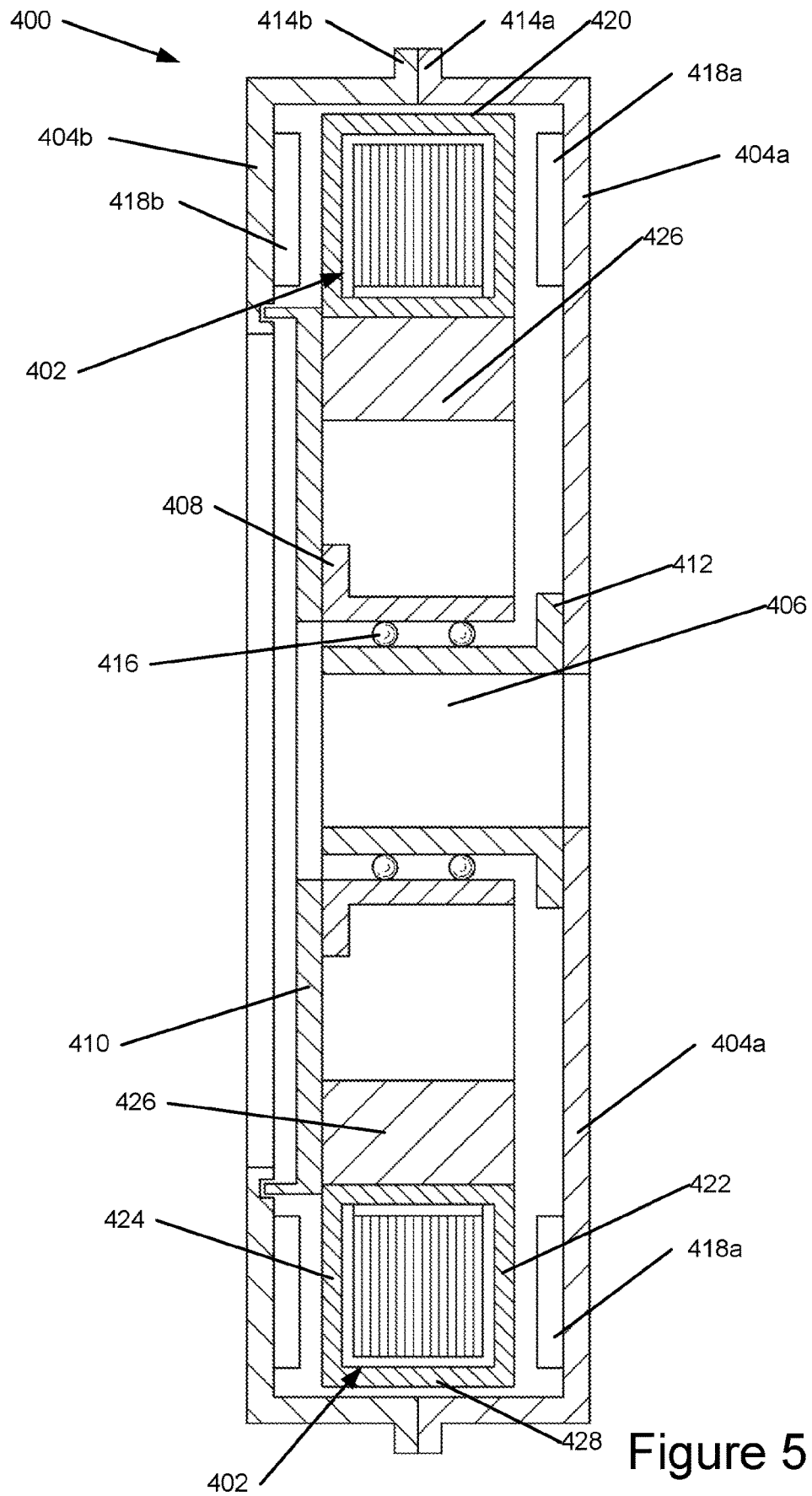
FIG. 5 shows a cut-through view of the machine of FIG. 4 once assembled.
Figure 6:
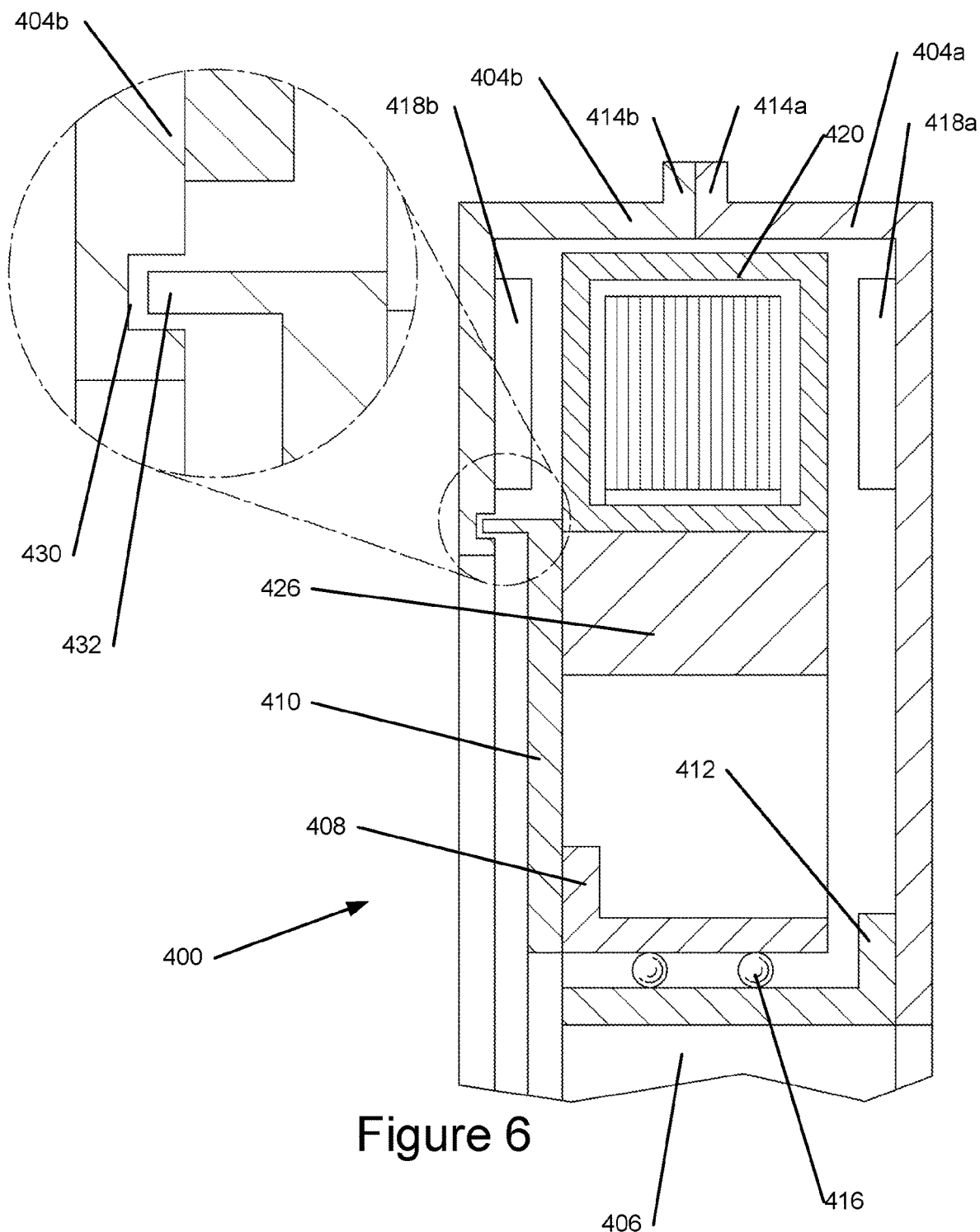
FIG. 6 shows a closer view of a portion of the machine shown in FIG. 5.
Figure 7:
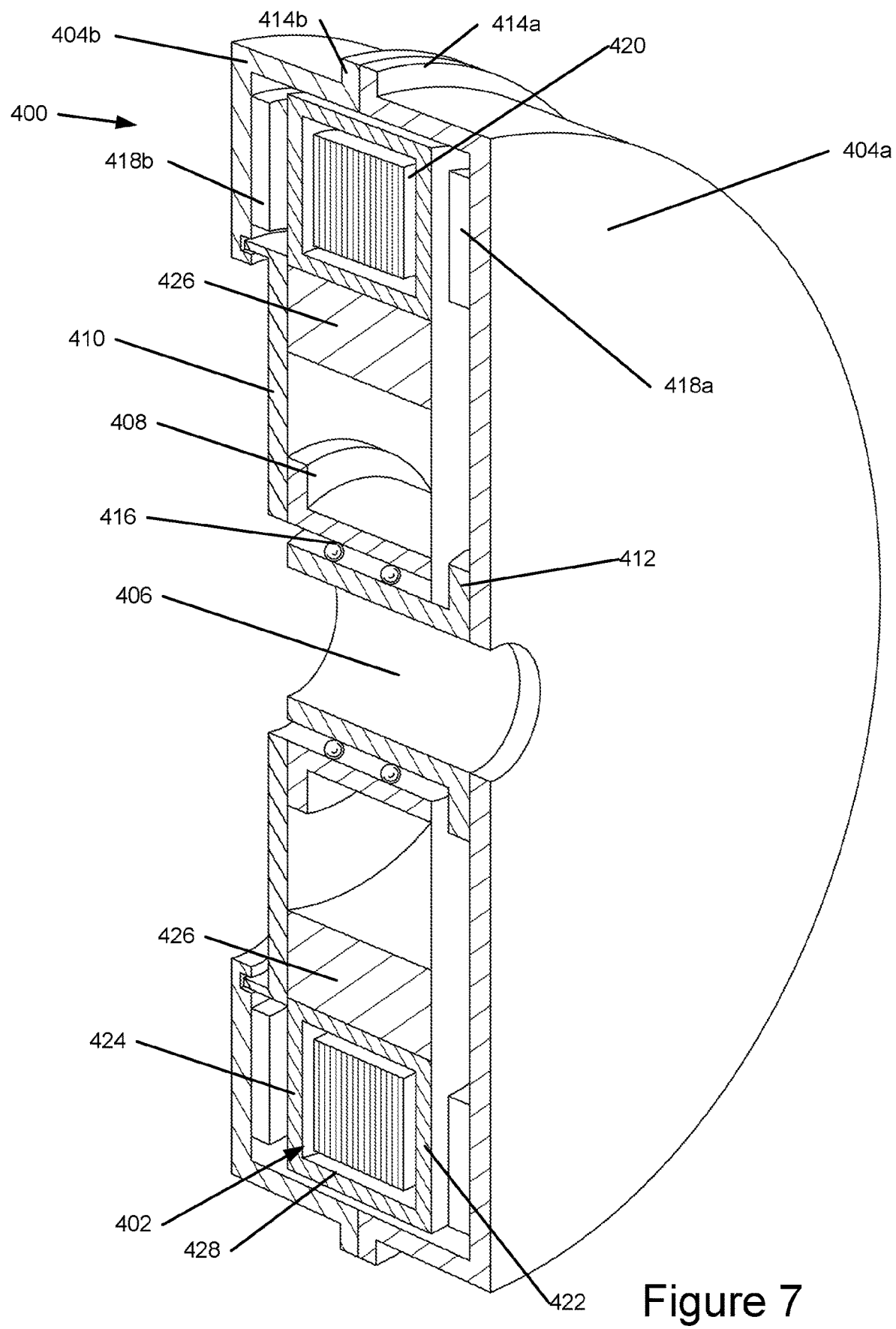
FIG. 7 shows a perspective view of the machine shown in FIG. 5.
Figure 8:
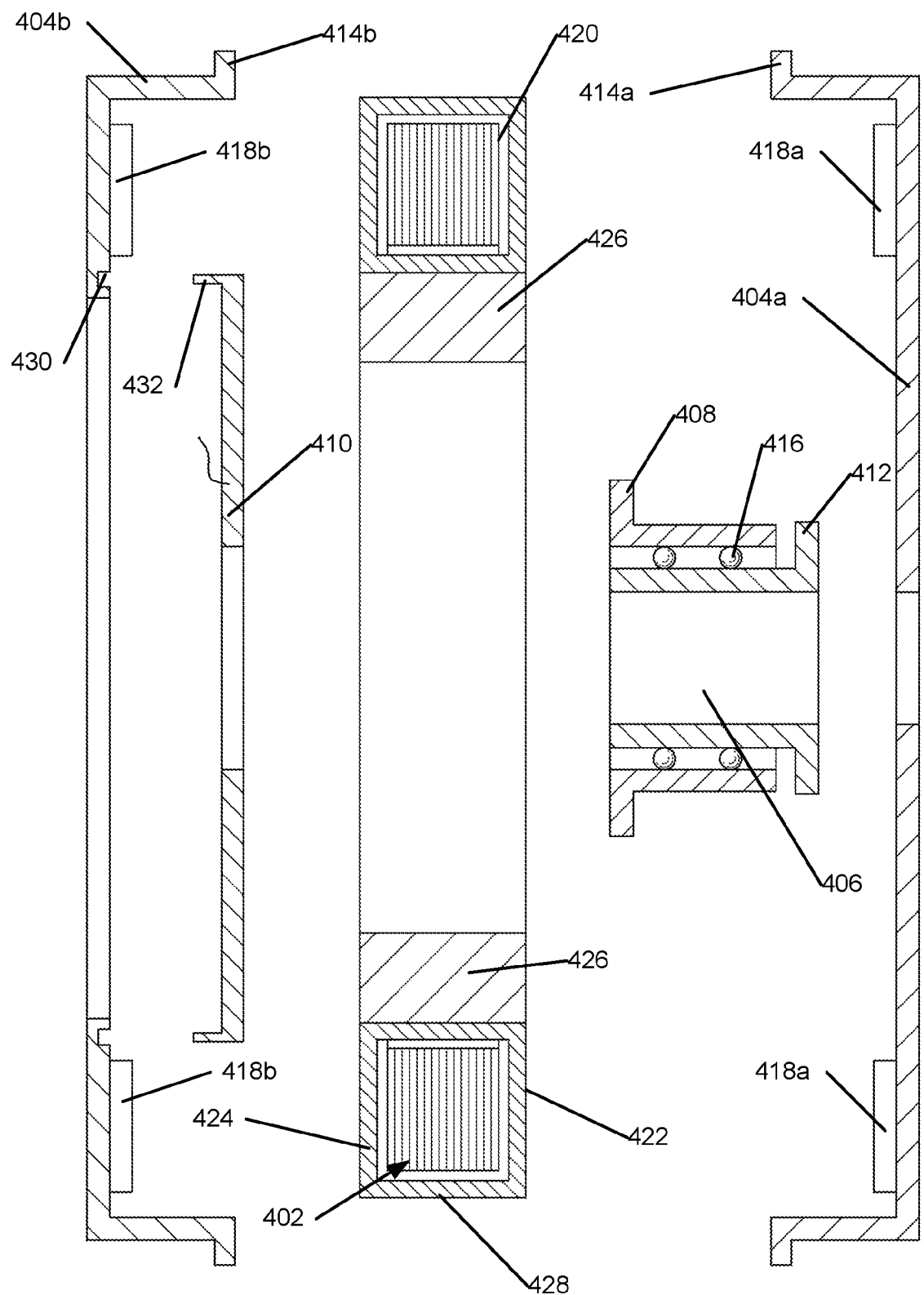
FIG. 8 shows an exploded cut-through view of the machine of FIG. 4.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastic material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

The coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically <10 μm) of glass bonding and mutually electrically insulating the iron particles, leaving some residual porosity. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

Referring now to FIGS. 4 to 8, which show various views (assembled, cut-through and exploded) of a YASA machine 400 comprising a stator 402 and a rotor 404 a, b. The rotor has a U-shaped design, that is the rotors 404a,b together form a U-shaped rotor that extends across and either side of the stator 402.

A hub assembly 406 is provided to mount the stator and rotor relative to each other. The hub assembly 406 comprises a rotating hub and a mount separated by a bearing 416, so that the hub can rotate relative to the mount. The rotating hub is provided with a hub flange 412 and the mount comprising a mount flange 408, each of the flanges being spaced axially apart from one another.

The stator 402 is mounted to the hub assembly 406 via the mount flange 408. In the embodiments shown, the stator 402 mounts on the hub assembly mount flange 408 via a bulkhead 410. The bulkhead 410 or mount flange 408 may be used to mount the machine to other structures.

The first rotor 404a mounts on the hub assembly via a hub flange 412 typically using bolts (not shown). The second rotor 404b mounts only to the first rotor 404a via a plurality of rotor flanges 414a,b along the outer axial rim of the first rotor 404a. The two rotors 404a,b form a U-shaped rotor extending across and either side of the stator 402 and rotate relative to the stator about the axis of the machine. As can be seen, the second rotor is an annulus that is not mounted on its inner periphery. Instead, it's inner periphery rotates over and relative to the stator and bulkhead on that side of the machine.

The rotors 404*a,b* have radial walls mounting a set of permanent magnets 418*a*. Rotor 404*a* provides a drive input/output, in the case of a generator/motor respectively, but for simplicity this is not shown in the figures.

Thus the machine is effectively a dual rotor machine where only one of the rotors 404*a* is mounted on the hub assembly 406 within the stator (shown simplified in FIG. 4), and the second rotor 404*b* is mounted only to the first rotor 404*a*.

The stator 402 has a housing 420 comprising first and second radial walls 422,424 and generally cylindrical inner and outer walls 426,428, defining a chamber within which coolant may circulate. The housing encloses a set of stator coils; these and their electrical connections are not shown for simplicity. The coils are wound around pole pieces (not shown).

The inner surface of the second rotor 404*b* (that is the surface facing the stator 402) is provided with an annular groove 430. This U annular groove 430 interacts with a correspondingly shaped feature 432 on the bulkhead 410 to create a labyrinth seal between the rotor 404*b* and stator 402. In the figures, the bulkhead 410 comprises a circular ridge 432 extending from the bulkhead and facing toward the rotor 404*b*. The ridge sits within the annular groove 430 to provide the labyrinth seal. Such a seal protects the magnetic air gap from ingress of particulate matter and incident liquid.

Typically double rotor single stator axial flux motors, which for reasons of torque output have small magnetic and physical air gaps, rely on massive rotor back irons to provide rotor stiffness to overcome substantial attractive forces that exist between permanent magnets distributed in a clockwise fashion borne by the rotor and stator pole-piece armatures. Bearings also need be stiff, that is with zero axial movement that would allow rotors to move towards the stator and thereby risk touching of rotor to the stator.

Massive iron structures are able to provide stiffness, but also increase the mass of motors so as to dilute torque and power density. Whereas for stationary land based application massive rotors are tolerant of higher mass, moving land based and airborne motors are sensitive to increased mass and efforts to reduce this provide considerable fuel/energy savings.

Using a wheel hub assembly as described above provides a benefit of bearing stiffness.

Whereas the wheel hub assembly provides a stiff bearing structure there is normally only one flange to support a wheel and another to attach to an automobile suspension/chassis. The wheel hub assembly and flange arrangement described above is therefore not typical of how double rotor single stator axial flux motors are assembled because to provide stiffness of structure both rotors are usually separately mounted to a bearing on either side of a stator.

Nevertheless a wheel hub assembly 406 with only one rotating hub flange 412 has been advantageously used in the present invention in combination with rotor 404*a* which is attached to the rotating hub flange 412, the rotor 404*a* partially enclosing the stator 402.

With a U-shaped rotor 404*a,b* of the present invention though attractive magnetic forces are high they are also balanced on either side of the stator 402. Out-of-balance attractive force are kept low by maintaining equal air-gaps between stator 402 and rotors 404*a,b* and the out-of-balance forces therefore do not present undue stress to the hub assembly structure (in particular the bearings) and particularly to the supporting rotor disk.

The U-shaped rotor 404*a,b* of the present invention is inherently a stiff structure. Stiffness in the rotor is valuable in resisting magnetic attraction of either rotor to the stator which attraction typically produces coning of otherwise flat, free standing rotors.

Increased stiffness is particularly true for the hub assembly 406 supported rotor side 404*a* which is supported by the hub assembly 406 at its inner diameter and by an axial circumferential ring at its outer diameter, which circumferential ring links to the second rotor 404*b* and provides the inherently stiff U-shaped structure.

The second rotor 404*b* gains no such resistance to coning because it is supported only on its outer periphery.

A second structure 430 (the annular groove) situated at the inner diameter of the second rotor 404*b*, surprisingly and advantageously provides increased stiffness to the second rotor 404*b* which resists coning of the inner periphery rim towards the stator 402 and is caused to engage with an axial protruding ridge 432 thereby leading to a labyrinth which effectively seals the rotor cavity with the narrow air gaps from ingress of particulates and liquid spray.

The whole rotor 404 because it is external and is effectively sealed against adventitious ingress of particulates and liquid spray can remain open to the atmosphere requiring no other protection and so can gain advantage of air cooling by virtue of its rotation.

It will be understood there are significant magnetic forces of attraction between rotors and stator for double rotor single stator axial flux motors and considerable care needs to be taken to prevent "touch-down" of rotors to the stator during assembly. It will be appreciated that a simple assembly jig may be used that draws rotors and stator together so as to minimise out-of-balance magnetic forces and once assembled the rotor is in a roughly neutral potential energy state. During assembly of the machine, one or more shims may be placed on the rotating side of the hub assembly in order to correctly place the rotors axially so as to provide equal air gaps between the rotors and stator.

Figure 9:
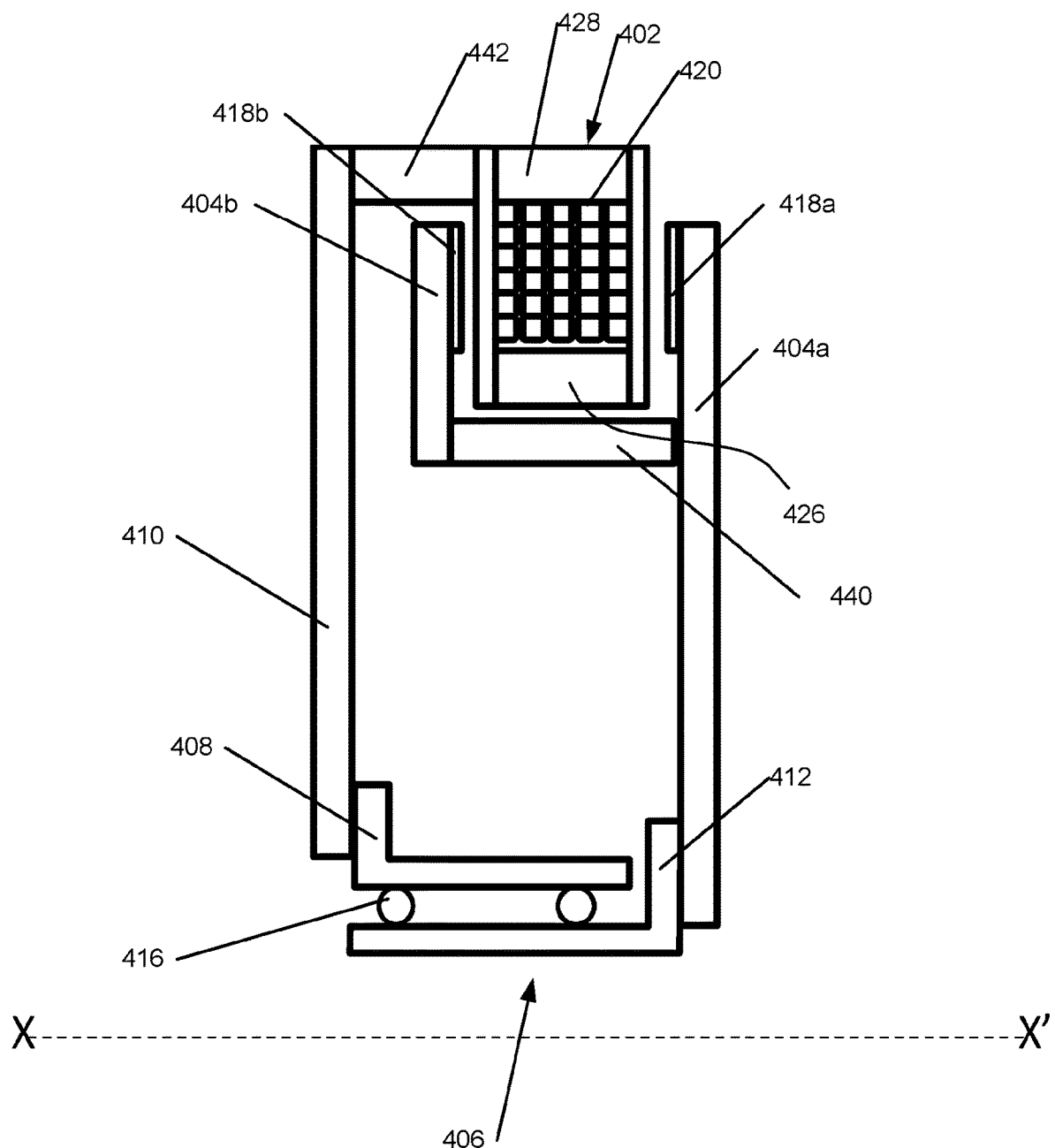
FIG. 9 shows a cut-through view of a portion of an alternative machine.
Figure 10:
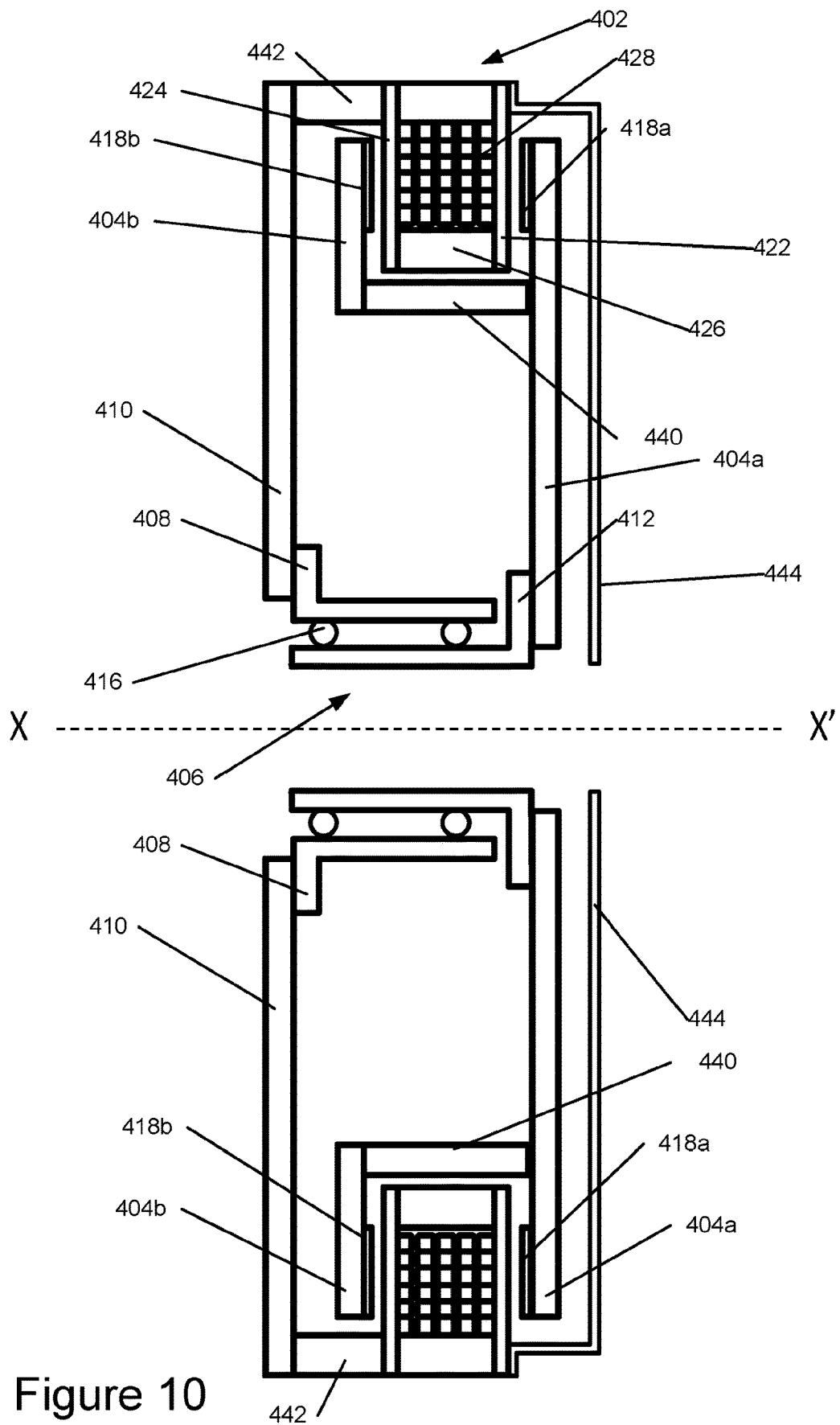
FIG. 10 shows a cut-through view of the machine of FIG. 9.

FIGS. 9 and 10 show an alternative machine having a different structure to the machine shown in FIGS. 4 to 8, but with common components. Like components are numbered similarly as above.

In the alternative machine of FIGS. 9 and 10, instead of the second rotor 404*b* being mounted only to the first rotor 404*a* along its outer axial rim, the second rotor 404*b* is mounted only to the first rotor 404*a* along an internal portion located radially inwardly from its outer axial rim. In the alternative machine, the first and second rotors form a U-shaped rotor extending across and either side of an internal radial periphery of the stator (instead of an external radial periphery of the stator as in the case of FIGS. 4 to 8).

As above, a hub assembly 406 is provided to mount the stator and rotor relative to each other. The hub assembly 406 comprises a rotating hub and a mount separated by a bearing 416, so that the hub can rotate relative to the mount. The rotating hub is provided with a hub flange 412 and the mount comprising a mount flange 408, each of the flanges being spaced axially apart from one another.

The stator 402 is mounted to the hub assembly 406 via the mount flange 408. In the embodiments shown, the stator 402 mounts on the hub assembly mount flange 408 via a bulkhead 410. The bulkhead 410 or mount flange 408 may be used to mount the machine to other structures. In this alternative machine, an additional mounting portion 442 is used between the stator and the bulkhead 410 in order to provide sufficient space between the bulkhead and stator in order to accommodate the second rotor 404b.

The first rotor 404a mounts on the hub assembly via a hub flange 412 typically using bolts (not shown). In this case, the first rotor 404a is shown as a flat disk, although other structures may be possible, for example a cupped rotor structure. The second rotor 404b mounts only to the first rotor 404a via a mounting portion 440 along an internal portion located radially inwardly from its outer axial rim of the first rotor 404a. The two rotors 404a,b together form a U-shaped rotor extending across and either side of the stator 402 and rotate relative to the stator about the axis of the machine. In this alternative machine, the U-shaped rotor extends across and either side of an internal radial periphery of the stator 402.

The second rotor 404b may be an annulus that is mounted on its inner periphery via a mounting portion 440. Alternatively, the second rotor 404b may be an L-shaped rotor (that is, the mounting portion is integral with the annulus described above). As such, its outer periphery rotates over and relative to the stator between the stator and the bulkhead on that side of the machine.

The rotors 404a,b have radial walls mounting a set of permanent magnets 418a. Rotor 404a provides a drive input/output, in the case of a generator/motor respectively, but for simplicity this is not shown in the figures.

Thus again the machine is effectively a dual rotor machine where only one of the rotors 404a is mounted on the hub assembly 406 within the stator, and the second rotor 404b is mounted only to the first rotor 404a.

There are many benefits of this alternative machine. For example, the magnetics are separate from the structural supporting elements and bearing so that the rotor structure 404a may be in two pieces, each of which may contain a ferromagnetic back-iron and a set of permanent magnets, with the inner periphery structural element easily modified, for example, to change the diameter of the bearing hub without altering the magnetics.

So too the mounting plate 410 may be changed without affecting the stator 402.

In FIG. 9, the machine is exposed to the environment on the first rotor 404a side of the machine. In FIG. 9, the structural mounting of the stator 402 to the hub assembly mount flange 408 encloses the second rotor side of the machine.

FIG. 10 shows an example of the machine comprising a cover 444 that is mounted to the stator 402 and encloses the first rotor 404a side of the machine. Alternatively, the cover 444 could be attached to the stator housing radially outer face.

The cover shown in FIG. 10 comprises an axle aperture. What is not shown is a lip seal which might be used if an axle is present. However, the cover 444 could equally have no axle aperture with input/output from the machine being taken through bulkhead 410.

In addition to the above benefits of this alternative structure, the physical air gap between stator and rotor may be adjusted by shim(s) on the rotating flange 412 or the stationary flange 408. The total physical air gap may remain constant, but the balance of this may be adjusted by shims between 412 and 404a, or between 408 and 410.

Whilst we have described the above machine with reference to the machine being a motor, we also envisage that the machine may be run as a generator to generate electricity from the rotation of the rotor 404 relative to the stator 402.

In order to couple rotational power into and out of the machine, a drive shaft or axle may be coupled to the first rotor 404a or the rotating hub of the hub assembly 406. Though not shown in the figures the internal surface of the hub assembly may have a splined surface. This may be used to couple power into and out of the machine via a shaft. However, the splined surface is not necessary, as the shaft may be coupled to the hub flange or a suitable surface of the rotor 404a.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An axial flux machine comprising:
a stator comprising a stator housing enclosing a plurality of stator bars disposed circumferentially at intervals around an axis of the machine, each of the stator bars having a set of coils wound therearound for generating a magnetic field;
a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction;
a hub assembly comprising a rotating hub and a mount separated by a bearing to permit the hub to rotate relative to the mount, the rotating hub comprising a hub flange and the mount comprising a mount flange, each of the flanges being spaced axially apart from one another;
a bulkhead for mounting the hub assembly and stator, wherein the bulkhead is mounted to the mount flange of the hub assembly, and wherein the stator housing is mounted to the bulkhead;
wherein the rotor comprises first and second rotors disposed either side of the stator, the first rotor being mounted to the hub flange and the second rotor being mounted only to the first rotor, the first and second rotors together forming a U-shaped rotor extending across and either side of the stator and being rotatable relative to the stator about the axis of the machine; and
wherein the machine is a yokeless and segmented armature axial flux machine.

2. An axial flux machine according to claim 1, wherein the second rotor is mounted only to the first rotor along its outer axial rim, forming a U-shaped rotor extending across and either side of an outer radial periphery of the stator.

3. An axial flux machine according to claim 2, wherein the second rotor is an L-shaped annulus, and wherein an inner surface of the second rotor facing the stator housing interacts with an outer surface of the bulkhead facing away from the stator to create a seal between the bulkhead and the second rotor to enclose the stator housing.

4. An axial flux machine according to claim 3, wherein the inner surface of the second rotor comprises an annular groove around an inner perimeter of the second rotor, an opening of the annular groove facing towards the stator housing, and wherein the bulkhead comprises a circular ridge facing towards the second rotor, the circular ridge being configured to sit within the annular groove of the second rotor to form a labyrinth seal with the annular groove.

5. An axial flux machine according to claim 1, wherein the second rotor is mounted only to the first rotor along an internal portion located radially inward from its outer axial rim, the first and second rotors together forming a U-shaped rotor extending across and either side of an internal radial periphery of the stator.

6. An axial flux machine according to claim 5, wherein the second rotor is an annulus comprising a mounting portion extending from the annulus, the second rotor being mounted to the first rotor via the mounting portion, and the mounting portion separating the first and second rotors axially in the machine.

7. An axial flux machine according to claim 5, comprising a cover to enclose the first rotor.

8. An axial flux machine according to claim 7, wherein the cover is attached to the stator.

9. An axial flux machine according to claim 5, wherein the bulkhead between the stator housing and the hub assembly mount flange encloses the second rotor.

10. An axial flux machine according to claim 1, wherein the stator is equidistant from the first and second rotors.

11. An axial flux machine according to claim 1, wherein the stator housing comprises first and second radial walls, and inner and outer generally cylindrical walls.

12. An axial flux machine according to claim 11, wherein one or both of the radial walls and the generally cylindrical walls comprise a polymer.

13. An axial flux machine according to claim 11 wherein one or both of the radial walls and the generally cylindrical walls comprises a thermoplastic polymer, a high temperature thermoplastic polymer, or PPA.

14. An axial flux machine according to claim 1, wherein the machine is mountable to a structure via the mount flange or the bulkhead.

15. An axial flux machine according to claim 1, wherein an axle extends from and is coupled to the rotating hub.

16. An axial flux machine according to claim 15, wherein the axle is coupled to a wheel or a propeller.

17. An axial flux machine according to claim 1, wherein the machine is a motor or generator.

18. A method of assembling a yokeless and segmented armature axial flux machine, the machine according to claim 1, and the method comprising:
  mounting the stator to the bulkhead;
  mounting the bulkhead to the hub assembly mount flange;
  mounting the first rotor to the hub assembly hub flange; and
  mounting the second rotor to the first rotor,
  wherein the first and second rotors form a U-shaped rotor extending across and either side of the stator, the rotors being rotatable relative to the stator about the axis of the machine.

19. A method according to claim 18, wherein the second rotor is mounted only to the first rotor along its outer axial rim, forming a U-shaped rotor extending across and either side of an outer radial periphery of the stator.

20. A method according to claim 19, wherein the second rotor is an L-shaped annulus, and wherein an inner surface of the second rotor facing the stator housing interacts with an outer surface of the bulkhead facing away from the stator to create a seal between the bulkhead and the second rotor to enclose the stator housing.

21. A method according to claim 20, wherein the inner surface of the second rotor comprises an annular groove around an inner perimeter of the second rotor, an opening of the annular groove facing towards the stator housing, and wherein the bulkhead comprises a circular ridge facing towards the second rotor, the circular ridge being configured to sit within the annular groove of the second rotor to form a labyrinth seal with the annular groove.

22. A method according to claim 18, wherein the second rotor is mounted only to the first rotor along an internal portion located radially inward from its outer axial rim, the first and second rotors forming a U-shaped rotor extending across and either side of an internal radial periphery of the stator.

23. A method according to claim 22, wherein the second rotor is an annulus comprising a mounting portion extending from the annulus, the second rotor being mounted to the first rotor via the mounting portion, and the mounting portion separating the first and second rotors axially in the machine.

24. A method according to claim 22, comprising mounting a cover to enclose the first rotor.

25. A method according to claim 24, wherein the cover is attached to the stator.

26. A method according to claim 22, wherein the bulkhead between the stator housing and the hub assembly mount flange encloses the second rotor.

27. A method according to claim 18, wherein, when the stator and first and second rotors are mounted, the stator is equidistant from the first and second rotors.

28. A method according to claim 18, comprising mounting the machine to a structure via the mount flange.

29. A method according to claim 18, comprising mounting an axle or shaft to the rotating hub or first rotor.

* * * * *